United States Patent [19]

Busian

[11] 3,755,889
[45] Sept. 4, 1973

[54] METHOD AND MEANS OF ASSEMBLING A DYNAMOELECTRIC MACHINE

[75] Inventor: Vincent V. Busian, Fort Wayne, Ind.

[73] Assignee: General Electric Company, Fort Wayne, Ind.

[22] Filed: Sept. 15, 1971

[21] Appl. No.: 180,771

[52] U.S. Cl. .................. 29/596, 29/271, 29/205 R, 33/181 R, 310/42
[51] Int. Cl.. H02k 15/00, H02k 15/14, H02k 15/16
[58] Field of Search .................. 29/205 R, 596, 598, 29/271; 310/42; 33/181 R

[56] References Cited
UNITED STATES PATENTS

| | | | |
|---|---|---|---|
| 3,268,986 | 8/1966 | Lacy | 29/596 |
| 3,521,494 | 7/1970 | Carrigan | 29/271 X |
| 3,359,628 | 12/1967 | Rutledge et al. | 29/596 |
| 2,453,297 | 11/1948 | Benson | 29/596 |
| 3,605,257 | 9/1971 | McMahon | 29/596 |

Primary Examiner—Charles W. Lanham
Assistant Examiner—Carl E. Hall
Attorney—Joseph B. Forman, John M. Stoudt and Ralph E. Krisher, Jr. et al.

[57] ABSTRACT

Procedure for establishing alignment of a rotor within a stator bore including at least approximately positioning shim means within a stator core bore and thereafter placing a rotor within the bore to establish a final position of the shim means and a preferred position of the rotor relative to the bore. Shim means includes a plurality of shim elements interconnected together to form shim cluster or shim pack that includes a centering element or disc. Plurality of shim elements are substantially simultaneously moved into stator bore and rotor is thereafter placed within the bore with at least part of the shim elements disposed in an air gap between rotor and stator. After the air gap between the rotor and stator has been permanently established, the individual shim elements are substantially simultaneously removed from the air gap. With "unit bearing" motors, it is advantageous to move shims in a first axial direction; move a rotor in the same axial direction; assemble a bearing system; once again move the shim elements in the same first axial direction.

17 Claims, 5 Drawing Figures

Patented Sept. 4, 1973
3,755,889
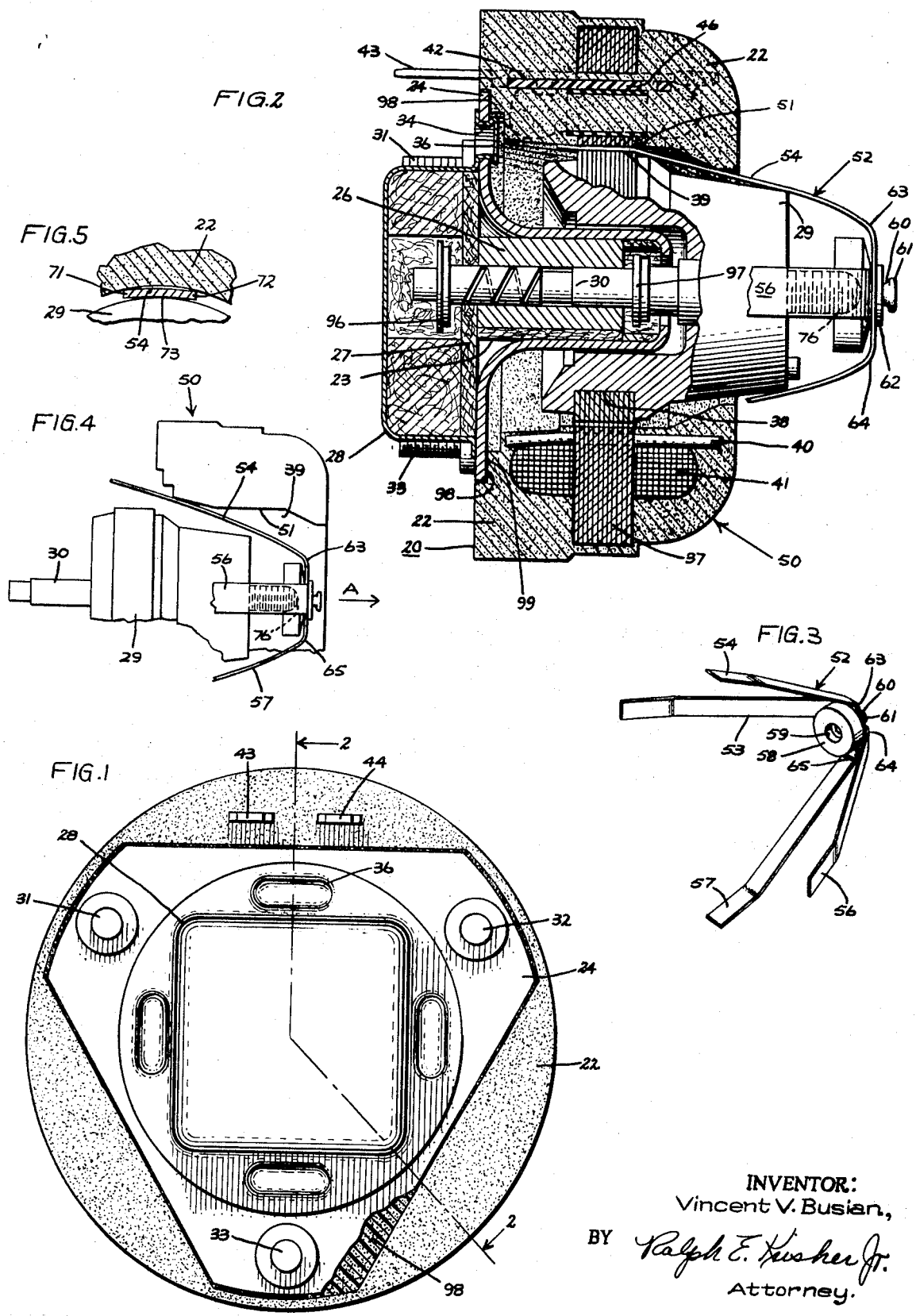
INVENTOR:
Vincent V. Busian,
BY Ralph E. Kusher Jr.
Attorney.

METHOD AND MEANS OF ASSEMBLING A DYNAMOELECTRIC MACHINE

BACKGROUND OF THE INVENTION

The present invention relates to dynamoelectric machines, and, more particularly, to an improved method and improved means for use in assembling such machines.

The desirability of establishing a predetermined relationship between stationary and movable parts of dynamoelectric machines has long been established in the art. Among other things, various desirable approaches for achieving this desirable objective are taught, for example, by the Wightman U.S. Pat. No. 3,176,380; Lacy U.S. Pat. No. 3,268,986; Rutledge U.S. Pat. No. 3,172,197; Rutledge et al. U.S. Pat. No. 3,359,628; DeJean et al. U.S. Pat. No. 3,222,234; Rutledge U.S. Pat. No. 3,195,222; and Thompson et al. U.S. Pat. No. 3,165,816; all of which are assigned to the assignee of this application.

Among other things, the above identified and other art describe and illustrate the use of shims in order to establish a predetermined air gap between a rotor and a stator of a dynamoelectric machine, e.g., a motor.

While the above identified and other patents have measurably advanced the state of the art, actual practice has shown that reliance on re-useable shims (made, e.g., from spring steel) has necessitated an expenditure of labor and effort during the actual assembly of dynamoelectric machines that, desirably, should be reduced if not eliminated.

For example, in those approaches utilized heretofore of which I am aware, individual elements or shims have been placed at spaced apart locations around the bore of a stator core, either before or after a rotor has been relatively loosely positioned within the stator bore. Then, after the rotor has been permanently assembled in a fixed relationship with the stator core, the shims have been individually removed. It will be appreciated, that when three or more shims have been used in practice (or in some cases two relatively wide and curved shims), the individual shims have been individually handled both while being initially placed and while being removed from an assembled dynamoelectric machine.

In addition to the problems associated with handling individual shims, difficulties have also been encountered in connection with initially assembling a plurality of shims and a rotor in the bore of a stator core. For example, difficulty of holding a plurality of shims in a desired position relative to a stator core while moving and positioning a rotor within the bore has been observed. On the other hand, difficulty in placing shims while a rotor is held in a bore has also been noted.

Accordingly, it would be desirable to provide new and improved methods and means whereby the handling of individual shims could be substantially reduced if not eliminated. It would also be desirable to provide a method of assembling a dynamoelectric machine wherein the means used for ultimately establishing a predetermined relationship between two parts of the assembly would facilitate rather than hinder the act of assembling two or more relatively movable parts.

SUMMARY OF THE INVENTION

Accordingly, it is an object of the present invention to provide a new and improved method for assembling a dynamoelectric machine.

Another object of the present invention is to provide new and improved means for use while assembling the parts of a dynamoelectric machine whereby assembly of the parts may be facilitated.

It is still another object of the present invention to provide a new and improved shim arrangement for use in the assembly of dynamoelectric machine parts.

It is a still more particular object of the present invention to provide both methods and means for assembling the parts of a dynamoelectric machine whereby individual shim elements may be handled and positioned substantially simultaneously.

In carrying out the objects of the invention in one form, there is provided an improved procedure for making motors and the like in which a desired alignment of a rotor within the bore of a stator is accomplished in a simple and facile manner. More particularly, in the practice of the invention in a preferred form, I at least approximately position spacer or shim means for determining an air gap within the bore of a stator core and, thereafter, by inserting a rotor within the bore, establish both a final position of the shim means and a preferred position of the rotor within the bore.

In a preferred form, the shim means or rotor position determining device includes a plurality of shim elements interconnected together to form what will be referred to hereinafter as a "shim cluster" or "shim pack." Preferably, the rotor position determining device also includes alignment means for use in centering the shim pack and rotor relative to each other about a longitudinal axis, e.g., the rotational axis of the rotor.

In the practice of a preferred method, a plurality of shim elements are substantially simultaneously moved into at least an approximate position within a stator bore. A rotor is thereafter placed, with force if necessary, within the bore of the stator so as to establish a uniform air gap with at least part of the shim elements disposed in the air gap. After the air gap between the rotor and stator has been permanently established by known procedures, the individual shim elements are substantially simultaneously again moved, e.g., by removing a shim cluster from the air gap. When motors of the type known in the industry as "unit bearing" motors are to be assembled, it may be particularly advantageous to move a plurality of shim elements in a first axial direction relative to the stator bore; move a rotor in the same axial direction and position the rotor in the bore; fixedly assemble a bearing system for the motor so as to permanently establish a predetermined air gap; and once again move the plurality of shim elements, in the first axial direction, from the assembled rotor and stator.

The subject matter which I regard as my invention is set forth in the appended claims. The invention itself, however, together with further objects and advantages thereof may be better understood by referring to the following more detailed description taken in conjunction with the drawings:

BRIEF DESCRIPTION OF THE DRAWINGS

FIG. 1 is an end view of a dynamoelectric machine constructed by following procedures in the practice of my invention in one form thereof;

FIG. 2 is a view taken generally along the lines 2—2 of FIG. 1 with parts in section and parts broken away;

FIG. 3 is a perspective view of a shim cluster embodying the invention in one form;

FIG. 4 is a somewhat schematic representation of the practice of the invention in one form while utilizing the shim cluster or shim pack illustrated in FIG. 3; and FIG. 5 is an enlarged fragmentary view, with parts in section and parts broken away, looking axially along the air gap between the rotor and stator of FIG. 2.

DESCRIPTION OF THE PREFERRED EMBODIMENTS

Referring now to the drawings in more detail, and in particular to the form of the invention as practiced in conjunction with the assembly of a dynamoelectric machine as illustrated in FIGS. 1 and 2, I have illustrated a unit bearing type motor 20 that includes a stationary composite structure 22. This structure is described in detail in a patent application filed on Jan. 29, 1970 in the name of Richard W. Dochterman and Michael E. Wendt, entitled DYNAMOELECTRIC MACHINE AND METHOD OF MAKING SAME, Ser. No. 6,666, and assigned to the assignee of the present invention. However, the present invention may be practiced with other structures and dynamoelectric machines as will be understood. Accordingly, in order to reduce the length of the present application, the disclosure of the Dochterman and Wendt application Ser. No. 6,666 as well as the patents identified in the second paragraph at the beginning of this application are specifically incorporated herein by reference. Similarly, the disclosure of Dochterman application Ser. No. 6,664 filed Jan. 29, 1970 and entitled DYNAMOELECTRIC MACHINE HAVING IMPROVED HOUSING, BEARING AND SUPPORT STRUCTURE, AND METHOD OF MAKING SAME is incorporated by reference. This last mentioned application discloses in detail and claims, inter alia, bearing systems and bearing support structures as disclosed herein.

Still having reference to FIG. 2, a bearing system 23 includes a bearing support 24 secured to the stationary composite structure 22. Furthermore, a sleeve bearing 26 is pressed into or otherwise secured to the bearing support 24, and lubricating means in the form of a feed wick 27 and an oil cover 28 are also assembled as shown. The rotatable assembly of the illustrated motor includes a rotor 29 secured in known manner to a shaft 30. The rotor is conventional and may be as shown and described, for example, in Lindt U.S. Pat. No. 3,304,448.

Also shown in FIGS. 2 and 3 are mounting means in the form of studs 31, 32 and 33. Apertures 34 and expanded fasteners 36 cooperate to secure the cover 28 to the bearing support 24. The bearing support in turn is adhesively secured by a structural adhesive material, such as epoxy material 98, to the surface 99 of the stationary composite structure.

Also denoted in FIGS. 2 and 3 are the salient polar projections 38 of laminated stator core 37; an air gap 39; winding coils 41 (the winding being retained from the bore of the stator core by winding pins 40); thrust system washers 96, 97; and a termination arrangement or means 42 that includes a terminal supporting member 46 and terminal elements 43, 44.

As will be understood, during assembly of the rotor and stationary structure, a preselected air gap 39 between the rotor and bore defining surfaces 51 of the stationary structure is desirably established. For use in establishing this air gap, shim means in a preferred form are generally denoted by the reference numeral 52 and are clearly shown in FIG. 3.

With reference to FIG. 3, means 52 has been illustrated as a shim cluster or shim pack comprising four separate shim elements or fingers 53, 54, 56, and 57. As will be appreciated from FIGS. 3 and 2, the shim cluster also includes alignment means for centering the cluster relative to the shaft of a rotor. This means has been illustrated as a centering disc 58 having an aperture 59 formed therein and includes a neck 60 that may be headed over as at 61 in order to permanently assemble the centering disc 58 with the shim elements.

The shim fingers or elements 53 and 56 comprise opposite ends of a single piece of shim material whereas the shim fingers 54 and 57 are also separate portions of a single piece of material. While substantially any suitable material may be selected for the shim fingers, it has been found that a commercially available material identified as "clock spring steel" is one such suitable material.

Fabrication of the shim elements 53, 54, 56, and 57 includes severing strip material, such as the steel mentioned, to provide a desired length of material sufficiently long to provide the desired number, e.g., two, interconnected shim fingers; and punching or stamping a hole in approximately the center of the strip of material to accept the neck 60 of centering disc 58. Thereafter, in the fabrication of the cluster of FIG. 3, the strips of material are approximately positioned at 90° relative to each other, the neck 60 of the centering disc 58 is positioned in the holes in the strips, and the neck 60 is headed over as shown at 61. For convenience of assembly, a washer 62 or other bearing member may also be provided (as best shown in FIG. 2) prior to forming the head 61. Prior to or after assembly of the centering disc 58 with the shim elements, the shim elements are preferably formed or bent as shown, for example, along the portions identified as portions 63, 64, and 65 in FIG. 3.

Although the procedure just described is preferred, it will be appreciated that a cluster having 2, 3, 5, or even 6 or more elements or fingers may be provided. Moreover, each of the elements may be formed separately, although it would be generally more economical and convenient to form two elements from a single strip as described.

By utilizing a shim cluster or pack, the individual handling, placement, and removal of a plurality of separate shim elements may be avoided.

A preferred method will now be described with reference to FIGS. 4 and 5. In FIG. 4, like reference numerals have been used to identify parts which are shown in more detail in FIGS. 1 through 3. Preferably, in the assembly of a unit bearing motor such as the motor 50, the shim cluster is inserted in a first direction generally along a longitudinal axis, this first direction being represented by the arrow A in FIG. 4. Since each of the shim elements or fingers are made from the same material and have substantially the same dimensions, e.g., 0.007 inch thick and ¼ inch wide clock spring steel, the shim cluster 52 will tend to be approximately self-centered relative to the central axis of the bore 39. After approximately centering the shim cluster in the bore, the rotor 29 is then moved in the direction of arrow A and the end 76 of the shaft 30 engages the centering disc 58. Thereafter, the rotor is moved to a desired final axial location relative to the stator with the centering disc pulling the shim cluster to the relative position shown in FIG. 2. It will be understood, of course, that during this movement, force applied to the rotor 29 will be transmitted to the shim cluster by means of the shaft 30.

At this time, the desired concentric relationship between the bore defining surfaces of the stationary structure and the outer peripheral surface of the rotor 29 is permanently or quasi-permanently established by any desired procedures. When a structural adhesive material is utilized to permanently assemble a bearing system as mentioned hereinabove, the shim cluster is removed from the permanently assembled structure of FIG. 2 by moving the shim cluster in the same direction of arrow A in FIG. 4.

FIG. 5 shows deformation that occurs while the shim element 54 is in the air gap between rotor 29 and structure 22. While it is not readily apparent from the drawing, the air gap in one actual exemplification was about 0.010 of an inch, while the element 54 was about 0.007 of an inch. However, the width of the shim material [¼ (one quarter) of an inch in the same exemplification[ was such that the shim element 54 was forced to at least somewhat follow the curvature of the rotor, with the lateral extremities 71, 72 of the element engaging the bore defining surface of the stator and a portion 73 of the element 54 engaging the rotor 29 as shown.

In the particular exemplification being described with an air gap of about 0.010 of an inch, the outer diameter of the rotor 29 was about 1 ¾ (one and three quarters) inches. It will be understood, therefore, that if the 0.007 inch shim material were used in a 0.010 of an inch air gap defined by a substantially larger rotor (i.e., one with a much greater diameter), the width of the shim material should be correspondingly increased, assuming that it was desired to establish a resilient centering action by the shims as in the case of the exemplified arrangement. The just described resilient centering action of element 54 also occurs, as will be understood, with the elements 53, 56, and 57.

In view of the foregoing it will be apparent to persons skilled in the art that advantages and features of the present invention are numerous and readily suceptible of utilization.

For example, while the invention has been described in connection with the assembly of a unit bearing type motor, it will specifically be understood that when a dual bearing (as well as a unit bearing, if preferred) motor is to be assembled while utilizing a shim cluster or shim pack such as that shown in FIG. 3, the shim cluster will be initially inserted in a first axial direction through openings formed in a bearing support or end frame of the motor, the rotor will usually then be moved in an axial direction opposite to the first direction; the permanently aligned relationship between the rotor and stator would then be established; and the shim cluster would subsequently be removed from the motor by moving it in such opposite axial direction relative to the stator. However, centering means, including a disc similar to disc 58, may also, if desired, be provided and used while assembling dual bearing motors. In all of the above exemplified procedures, the shim cluster may be removed manually or by utilizing a suitable fixture that may, if desired, include a fluid cylinder arranged to facilitate removal of the shim cluster from an assembled dynamoelectric machine.

Therefore, while in accordance with the Patent Statutes I have described what at present is considered to be a preferred form of the invention, it will be obvious to those skilled in the art that numerous changes and modifications may be made therein without departing from the invention.

What I claim as new and desire to secure by Letters Patent of the United States is:

1. A method of manufacturing a dynamoelectric machine comprising a first structure having bore defining surfaces, and a second structure having an outer surface spaced from the at least one surface; at least one bearing system interconnecting the first and second structures for rotative movement relative to one another about a longitudinally extending axis; the method comprising the steps of: substantially simultaneously positioning a plurality of spaced apart and longitudinally extending shim elements adjacent to at least one of the surfaces; thereafter moving the second structure in an axial direction relative to the first structure and positioning the outer surface of the second structure adjacent to the bore defining surface, and resiliently deforming the longitudinally extending shim elements as the outer surface and bore defining surface are positioned adjacent to one another with the shim elements positioned between and resiliently centering the outer surface of the second structure relative to the bore defining surface of the first structure; subsequently permanently assembling together the first and second structures while maintaining the centered relationship of the second structure relative to the first structure and while the shim elements are positioned between the outer surface and bore defining surface; and thereafter removing the plurality of shim elements from the first and second structures.

2. The method of claim 1 wherein the step of positioning a plurality of shim elements comprises substantially simultaneously moving all of the shim elements in a first given direction relative to the first structure and the step of removing the plurality of shim elements comprises substantially simultaneously moving all of the shim elements relative to the first and second structures.

3. The method of claim 2 wherein the step of removing the plurality of shim elements includes moving the shim elements in the first given direction.

4. The method of claim 3 wherein the step of moving the second structure in an axial direction is accomplished by effecting relative movement in the first given direction between the first and second structures.

5. A method of manufacturing a dynamoelectric machine comprising a stator having a longitudinally extending bore and rotor assembly supported in the bore; the method comprising the steps of substantially simultaneously positioning a plurality of spaced apart and longitudinally extending reuseable shim elements comprising at least part of a shim means in the bore of the stator; thereafter moving the rotor assembly and bore into a substantially concentric air gap defining relationship with the previously positioned shim elements disposed in the air gap between the rotor assembly and stator; permanently securing the assembly of the rotor assembly and stator while the shim elements remain in the air gap; and subsequently substantially simultaneously removing the plurality of shim elements from the air gap.

6. The method of claim 5 wherein the step of moving the rotor assembly and bore into a substantially concentric air gap defining relationship includes moving the rotor assembly into engagement with a portion of the shim means disposed generally along the longitudinal axis of the bore, with subsequent movement of the rotor assembly relative to stator causing movement of the shim means relative to the stator.

7. The method of claim 5 wherein the rotor assembly includes a centrally disposed shaft and the shim means comprises a shim cluster held together by a centering member and wherein the method further comprises the step of moving the shaft of the rotor assembly into engagement with the centering member and thereafter moving the shim cluster in a first axial direction by moving the shaft in the same axial direction.

8. The method of claim 7 wherein the step of removing the plurality of shim elements from the air gap includes moving the centering member axially away from the shaft.

9. A method of assembling a dynamoelectric machine comprising a stator core having a longitudinally extending bore, and a rotor supported within the bore, the method comprising the steps of: positioning a plurality of shim elements, fastened together to form a cluster, in the bore of the stator core; thereafter relatively moving the core and rotor into proximity with each other and centering the rotor in the bore with at least a portion of the shim elements disposed in a gap between a surface of the rotor and the bore of the stator; securing at least one bearing system to the dynamoelectric machine while the at least a portion of the shim elements are disposed in the gap; and substantially simultaneously removing the shim elements from the air gap between the rotor and stator after the at least one bearing system is secured, by moving the shim cluster relative to the stator core.

10. The method of claim 9 wherein the rotor includes a longitudinally extending shaft, the shim cluster includes a centering member, and further including the step of engaging the centering member with the shaft and moving the shim cluster in a longitudinal direction relative to the stator core by effecting relative movement between the stator core and shaft in the same longitudinal direction.

11. The method of claim 9 wherein the step of securing at least one bearing system includes the step of adhesively securing at least a portion of the bearing system to at least a portion of the dynamoelectric machine.

12. A shim cluster for use in assembling relatively movable parts of a dynamoelectric machine having a predetermined air gap therebetween, said cluster comprising a plurality of shim elements each having a pair of free extremities and each having a portion between the free extremities thereof held in proximity to at least one portion of another one of the shim elements between the free extremities of the another one, whereby all of the shim elements of the cluster may be substantially simultaneously moved into proximity with at least one part of a dynamoelectric machine and thereafter substantially simultaneously moved away from the at least one part of the dynamoelectric machine.

13. The shim cluster of claim 12 further comprising a centering member secured to the shim elements, said centering member being positioned at least approximately at a juncture of the shim elements.

14. The shim cluster of claim 12 wherein the shim elements are formed of resilient material and have a thickness selected to be less than the predetermined air gap of the dynamoelectric machine.

15. A shim pack for use in establishing an air gap between first and second relatively movable parts in an assembled structure, said shim pack comprising a plurality of spaced apart longitudinally extending shim elements, each of the elements having two free extremities and having at least one portion between the two extremities thereof secured to at least one other of the plurality of elements; and a centrally disposed member secured to said at least one portion of at least one of the shim elements.

16. The shim pack of claim 15 wherein at least two shim elements are formed from a strip of resilient material having two extremities; said strip of material having an opening formed in a central portion thereof and being permanently deformed in a region between the opening and each of the free extremities thereof; and wherein the centrally disposed member has a portion thereof secured in said opening.

17. The shim pack of claim 15 wherein the shim elements are formed from strips of spring steel and the centrally disposed member is an element having a portion thereof securing the shim elements together.

* * * * *